Feb. 6, 1923.

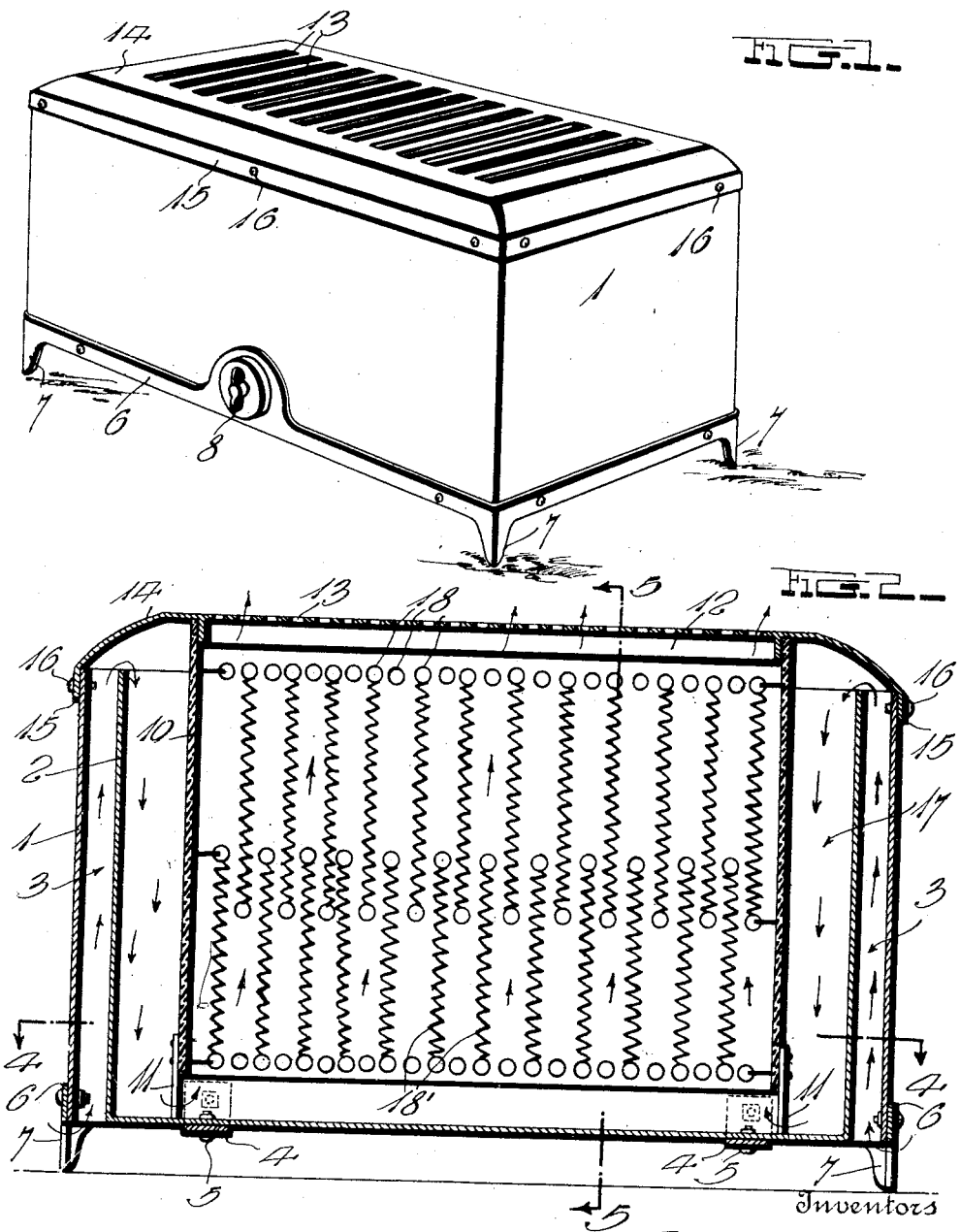

L. F. LYNN ET AL 1,444,621

ELECTRIC HEATER

Filed Feb. 16, 1922

Witness
H. Woodard

Inventors
J. D. Lewis
L. F. Lynn

By H. B. Willson & Co.
Attorneys

Feb. 6, 1923.
L. F. LYNN ET AL
1,444,621
ELECTRIC HEATER
Filed Feb. 16, 1922
3 sheets-sheet 3
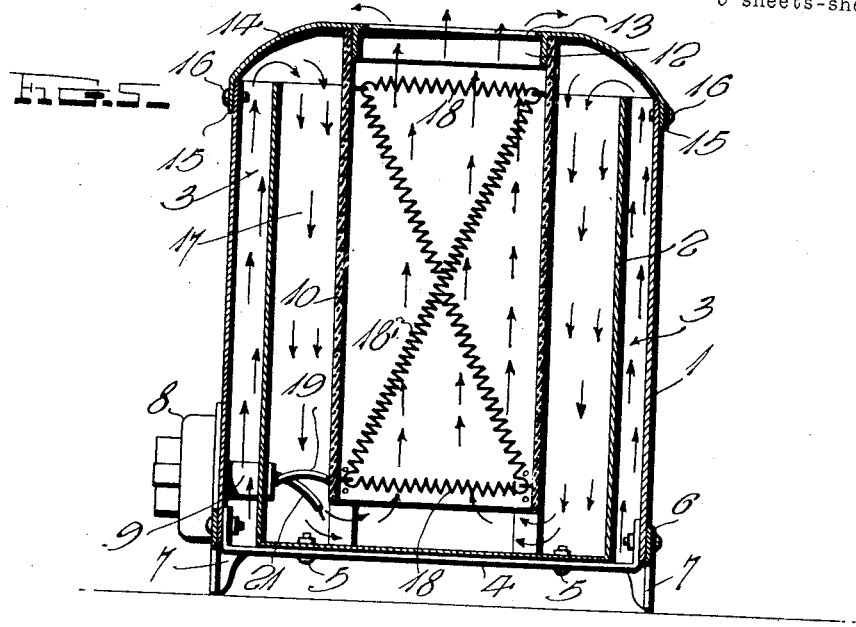
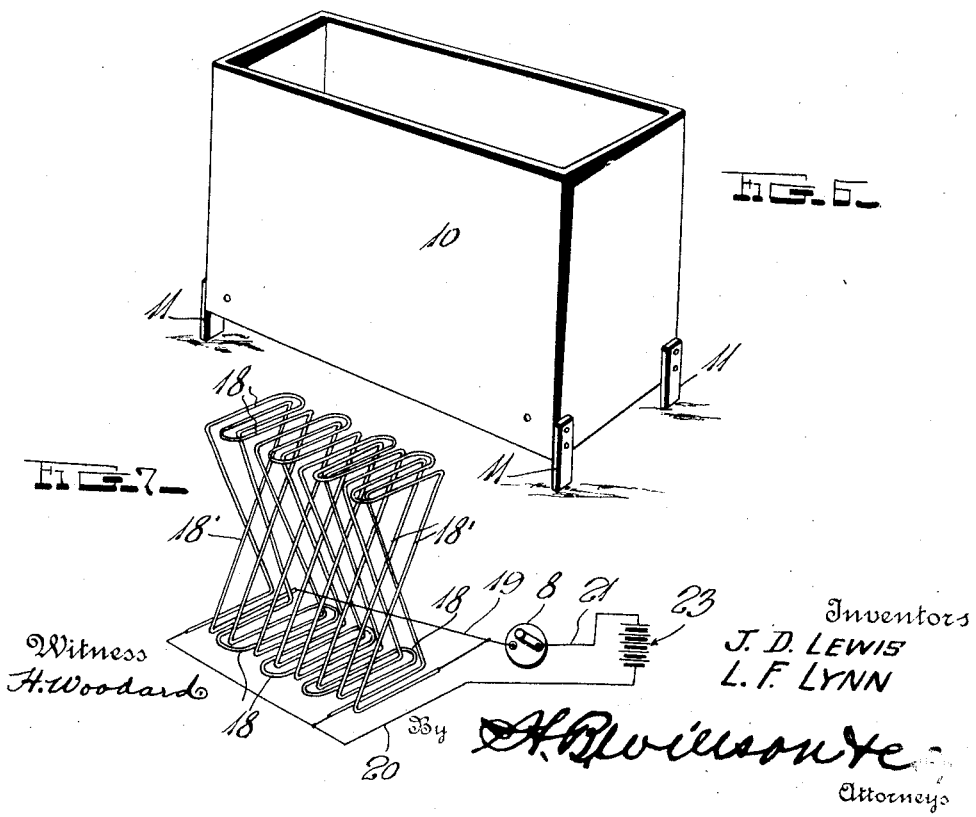
Inventors
J. D. LEWIS
L. F. LYNN Patented Feb. 6, 1923.

1,444,621

UNITED STATES PATENT OFFICE.

LAWRENCE F. LYNN AND JOHN D. LEWIS, OF TACOMA, WASHINGTON.

ELECTRIC HEATER.

Application filed February 16, 1922. Serial No. 536,976.

*To all whom it may concern:*

Be it known that we, LAWRENCE F. LYNN and JOHN D. LEWIS, citizens of the United States, residing at Tacoma, in the county of Pierce and State of Washington, have invented certain new and useful Improvements in Electric Heaters; and we do declare the following to be a full, clear, and exact description of the invention, such as will enable others skilled in the art to which it appertains to make and use the same.

This invention relates to an improved electric heater and one object of the invention is to provide an electric heater having an improved type of housing in which the heating element will be positioned, this housing being so constructed that the air will pass in a tortuous path through the housing before passing through the compartments thereof in which the heating element is placed. It will thus be seen that the air will be preheated before entering the compartment having the heating element positioned therein and this air will be very well heated when it leaves the heater.

Another object of the invention is to provide a heater in which the housing may be provided with an outer shell, an inner shell positioned in spaced relation to the outer shell and thus provide an air passage between the inner and outer shells and an inner compartment within the inner shell and open at its upper and lower ends so that the air after passing upwardly between the inner and outer shells may pass downwardly between the inner shell and inner compartment and then pass upwardly through the inner compartment where it will be thoroughly heated by the heating element positioned in this inner compartment.

Another object of the invention is to provide a heater in which the inner shell may be supported within the outer shell by means of cross strips which extend beneath the inner shell and are connected with the outer shell and in which the inner compartment may rest in the inner shell and have its upper end portion engaging a cover carried by the outer shell and closing the space between the upper end portion of the inner compartment and outer shell.

Another object of the invention is to provide a heater which may be easily taken apart when it is desired to clean or repair the same.

Another object of the invention is to provide a heater in which the inner compartment may be removed from the inner shell of the housing after the cover thereof has been removed and carry with it the heating coils which will be positioned in the inner compartment.

Another object of the invention is to provide a heater which will be formed principally of sheet metal and will thus be light in weight and easy to handle and at the same time strong and durable.

This invention is illustrated in the accompanying drawings, wherein:

Figure 1 is a perspective view of the improved heater.

Figure 2 is a vertical longitudinal sectional view through the heater.

Figure 5 is a vertical transverse sectional view taken along the line 5—5 of Fig. 2.

Figure 6 is a perspective view of the inner compartment in which the heating element will be placed.

Figure 7 is a view showing the heating element in perspective and the energizing circuit diagrammatically.

Figure 3:
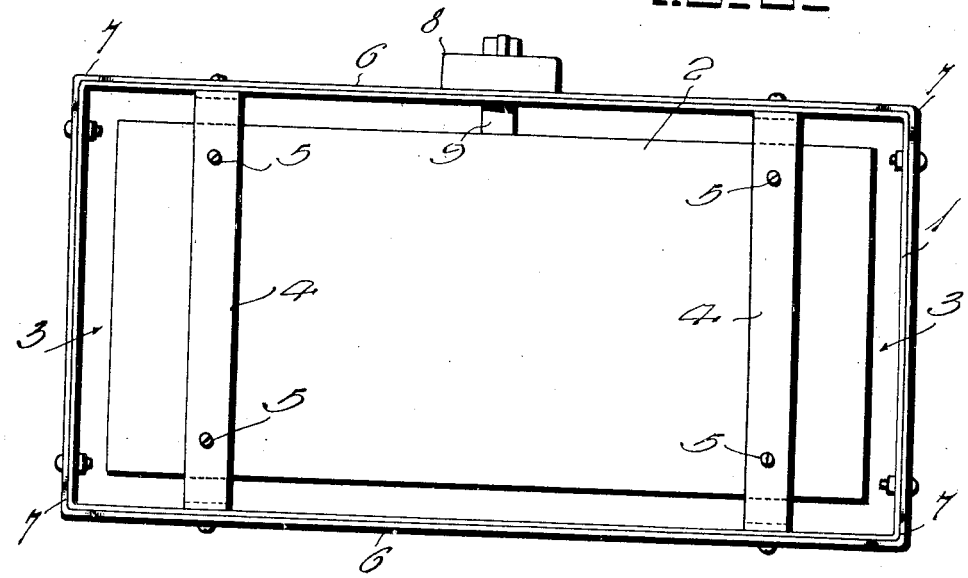
Figure 3 is a bottom plan view of the heater.
Figure 4:
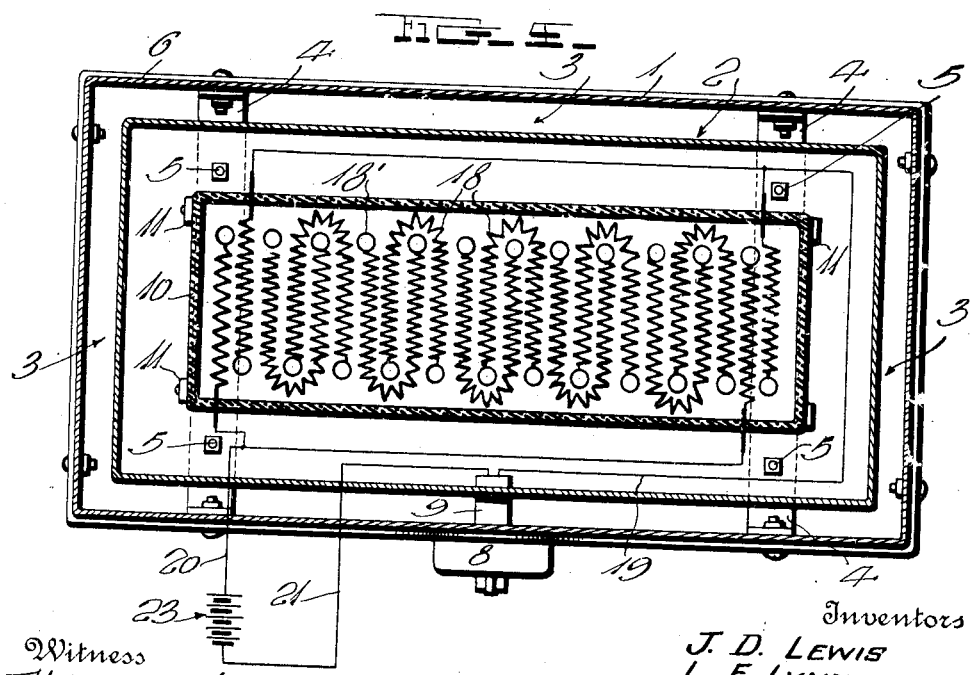
Figure 4 is a longitudinal horizontal sectional view through the heater taken along the line 4—4 of Fig. 2.

This improved heater is provided with a housing having an outer shell 1 and an inner shell 2 which is placed within the outer shell in spaced relation to the same, thus providing a space 3 between the inner and outer shells so that air can pass upwardly between these two shells as indicated by the arrows in Figs. 2 and 5. This inner shell will rest upon cross strips which extend transversely in the bottom portion of the outer shell and have upturned end portions through which fastener bolts will be passed. Securing bolts 5 are provided to releasably anchor the inner shell to the supporting strips 4 and it will thus be seen that this inner shell can be removed very easily when desired. A base strip 6 extends about the lower end portion of the outer shell and is provided at the corners thereof with depending feet 7 so that the heater will be supported in spaced relation to the floor and air thus permitted to pass beneath the heater and upwardly through the space between the inner and outer shells. The switch 8 which will be of a conventional construction is mounted intermediate the length of the housing and will preferably be provided with a neck extension 9 so that the wires will be led into the inner shell 2.

The inner compartment 10 in which the heating element shown in Fig. 7 will be mounted, is positioned within the inner shell and is formed of sheet metal and open at its upper and lower ends. Supporting legs 11 are provided so that this inner compartment will be supported above the closed bottom of the inner shell. The upper end of this inner compartment extends above the upper end of the inner and outer shells and will receive a depending neck or flange 12 which extends downwardly about the slotted portion 13 of the cover 14. This cover 14 has its solid border portion extending from the slotted portion to the upper edge of the outer shell and in spaced relation above the upper end of the inner shell. The depending flange portion 15 of the cover fits against the outer shell and securing screws 16 are passed through this flange 15 to removably secure the cover in place. From an inspection of Figs. 2 and 5, it will be readily seen that the air after passing upwardly through the space 3 between the inner and outer shells will pass over the upper end of the inner shell and will then pass downwardly through the space 17 between the inner shell and compartment 10 until it reaches the lower end of the inner compartment. The air will then pass upwardly through the inner compartment and in doing so will be thoroughly heated by the heating element positioned in this inner compartment before it passes out through the grating 13. It will be obvious that when the heater is in operation, the inner compartment 10 and inner and outer shells will be heated and therefore when the air is passing upwardly between the inner and outer shells and then downwardly between the inner shell and inner compartment, the air will be preheated and will enter the inner compartment as warm air.

The heating element is in the form of a double coil, each of which is formed from a single length of wire bent to provide upper and lower U-shaped portions 18 which are connected by sections 18' which extend diagonally of the inner compartment as shown in Figs. 5 and 7. It should be further noted that the U-shaped portions of one of the coils extend in opposed and overlapping relation to the U-shaped sections of the second coil and that the diagonally disposed portions of the two coils extend in crossed relation. Therefore, when the air is passing upwardly through the inner compartment 10, the air will be heated in a very efficient manner and will pass out through the grating 13 as very warm air. The wire 19 which extends from the switch 8 is connected with the terminals of the two coils at one side of the heating element and the terminals of the coils at the other side of the heating element are connected with a wire 21 which will be led through the inner and outer shells of the housing. This wire together with the wire 21 which leads from the switch may be provided with a suitable socket coupling so that a connection of the usual type may be provided to receive current from the source of supply. This plug has not been shown as it is a conventional structure and if desired may be done away with and the wires 20 and 21 connected with a battery 23. It will thus be seen that there has been provided a heater so constructed that it may be operated by electricity and so constructed that the air will be heated in a very efficient manner and preheated before it enters the inner compartment where the final heating takes place. It will be further noted that the heater is provided with a heating element in the form of a double coil which is very effective in operation and will serve to thoroughly heat the air. It will also be noted that the heater is so constructed that it may be readily taken apart for repair or cleaning and then easily and quickly put together again.

We claim:

1. A heater of the character described comprising a housing open at its bottom and having a top provided with an outlet intermediate its length and width, an inner shell in the housing closed at its bottom and open at its top and having its walls in spaced relation to the walls of the outer shell and terminating in spaced relation to the top, an open-ended inner compartment positioned within the inner shell and supported above the bottom thereof and having its upper end engaging the top of the housing about the outlet portion thereof, and heating means within the inner compartment whereby air may be preheated in passing upwardly between the inner shell and outer shell and downwardly between the inner shell and inner compartment and thoroughly heated in passing upwardly through the inner compartment and out through the outlet in the top.

2. An air heater comprising a housing having an outer shell supported in spaced relation to the floor and open at its lower end and provided with a top with its intermediate portion as an outlet portion, supports in the lower end portion of said outer shell, an inner shell in the outer shell resting upon the supports and closed at its lower end and open at its upper end and having its walls extending in spaced relation to the walls and top of the outer shell, whereby air may pass upwardly between the shells and into the inner shell through the upper end thereof, a depending flange carried by the top about the outlet portion thereof, an inner compartment positioned within the inner shell and open at its upper and lower ends and having its open upper end receiving the depending flange of the top, the inner compartment being positioned in spaced relation to the walls of the inner shell and having its lower end supported in spaced relation to the bottom of the inner shell, whereby air may pass downwardly between the inner shell and inner compartment and upwardly through the inner compartment and out through the outlet of the top, and heating means in the inner compartment.

3. An air heater comprising a housing having a top provided with an outlet portion, a heating chamber in the housing having its upper end portion positioned about the outlet portion of the top thereof whereby air may pass through the heating compartment and through the outlet in the top of the housing, and heating means in the heating compartment, said heating means being electrically operated and in the form of a coil structure having portions extending substantially horizontally in the upper and lower end portions of the heating compartment and portions extending diagonally therein in crossed relation between the upper and lower sections of the coil.

4. An air heater comprising a housing having an inlet and having a top provided with an outlet for heated air, a chamber in the housing having its upper end portion positioned about the outlet in the top of the housing and having its lower end portion open to provide an inlet, and heating means in the inner chamber in the form of an electric coil having portions positioned adjacent the upper and lower ends of the chamber and positioned substantially horizontally and transversely of the chamber, and portions connecting the upper and lower horizontally disposed portions and extending diagonally in the inner chamber in crossed relation.

5. An air heater comprising a housing having an inlet and having a top provided with an outlet for heated air, a chamber in the housing having its upper end portion positioned about the outlet in the top of the housing and having its lower end portion open to provide an inlet, and heating means in the inner chamber, said heating means being in the form of a double electric coil, each coil having portions positioned transversely in the chamber adjacent the upper and lower ends thereof and substantially U-shaped with the U-shaped portions of one coil extending in an opposite direction to the U-shaped portions of the second coil and in overlapping relation to the same, and diagonally disposed coil portions extending in crossed relation in the inner chamber and connecting the arms of the upper U-shaped sections with the arms of the lower U-shaped sections.

6. The structure of claim 5 having the U-shaped portions of each coil in the upper portion of the chamber extending in an opposite direction to the U-shaped portions of the said coil in the lower portion of the chamber, the U-shaped portions of the two coils having their arms extending in overlapping relation with the arms of the U-shaped portions of one coil extending between the arms of the U-shaped portions of the second coil.

In testimony whereof we have hereunto set our hands.

LAWRENCE F. LYNN.
JOHN D. LEWIS.